United States Patent [19]

Coules

[11] 4,192,478
[45] Mar. 11, 1980

[54] QUARTER TURN CIRCUIT BOARD GUIDE

[75] Inventor: Ronald A. Coules, Barrington, Ill.

[73] Assignee: Richco Plastic Company, Chicago, Ill.

[21] Appl. No.: 891,021

[22] Filed: Mar. 28, 1978

[51] Int. Cl.² .............................................. F16M 13/00
[52] U.S. Cl. ................................ 248/222.3; 248/500; 175/138 D; 361/415
[58] Field of Search .............. 248/222.2, 222.3, 441 B, 248/441 C, 451, 73, 500, 239, 221.3, 316 D; 211/41; 361/415; 174/138 D

[56] References Cited
U.S. PATENT DOCUMENTS

| 3,179,367 | 4/1965 | Rapata | 248/222.3 X |
| 3,216,580 | 11/1965 | Fricker | 211/41 |
| 3,652,899 | 3/1972 | Henschen | 174/138 D X |
| 3,764,729 | 10/1973 | Kowalewski | 174/138 D |
| 3,811,154 | 5/1974 | Lindeman | 174/138 D X |
| 3,829,741 | 8/1974 | Athey | 174/138 D |
| 3,909,883 | 10/1975 | Fegen | 174/138 D X |
| 3,954,242 | 5/1976 | Yoda | 248/221.4 |

Primary Examiner—William H. Schultz

[57] ABSTRACT

A support for securing a circuit board on an apertured panel, wherein the support has a slot for slideably receiving and a tab for releaseably holding a circuit board therein, and a quarter turn fastener engageable in the panel aperture, said fastener and aperture having cooperating means for receiving said support and locking means for mounting the fastener upright on the panel upon manipulating the fastener a quarter turn in the aperture.

11 Claims, 5 Drawing Figures

U.S. Patent     Mar. 11, 1980     4,192,478
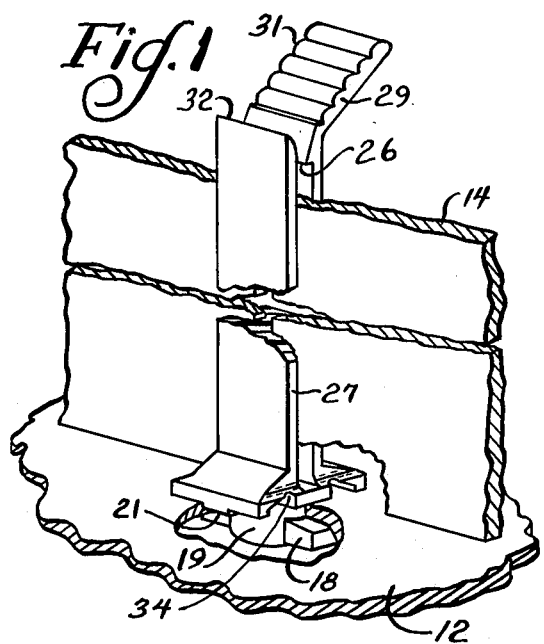
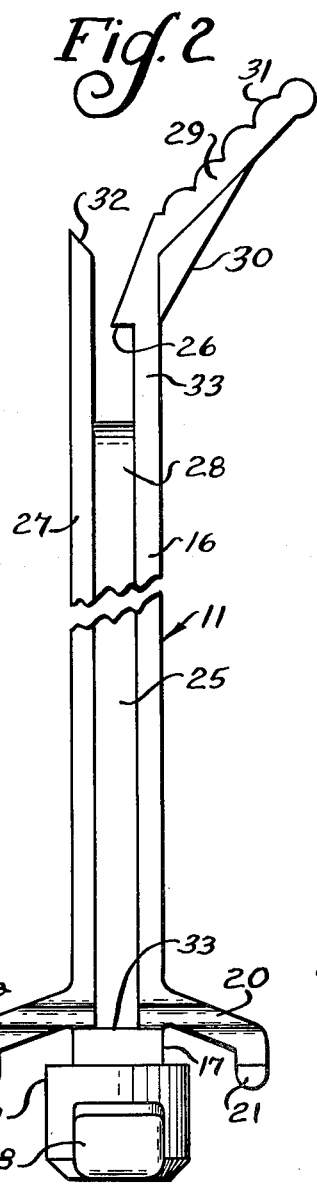
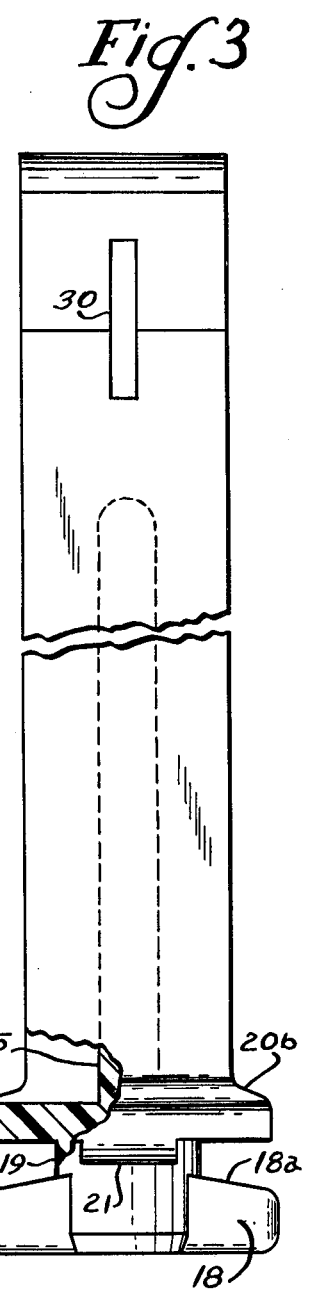
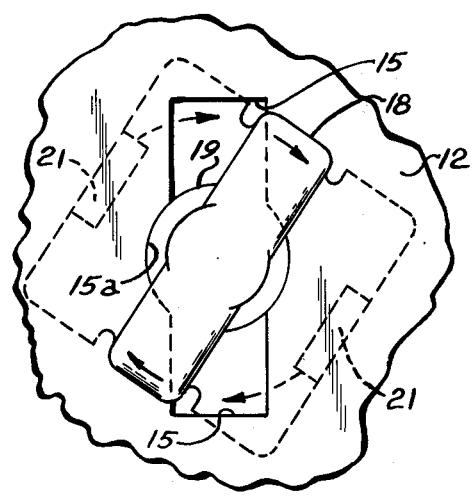
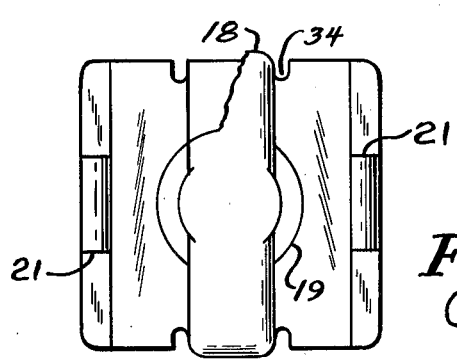

QUARTER TURN CIRCUIT BOARD GUIDE

BACKGROUND AND SUMMARY OF THE INVENTION

This invention relates to a support for securing a circuit board on an apertured panel, and is more particularly concerned with a support of the character described which has a slot for slideably receiving and a tab for releaseably holding a circuit board therein, and which has a quarter turn fastener engageable in the panel aperture, said fastener and aperture having cooperating means for receiving the support in the aperture and locking means for mounting the fastener upright on the panel upon manipulating the fastener a quarter turn in the aperture.

Supports embodying the features of the invention are particularly useful for installations where the circuit board must be secured rigid and in a selected position, but cushioned to withstand shock, as, for example, where the equipment in which the devices are installed is mobile or subject to vibrations. Furthermore, devices embodying the invention permit easy removal of the circuit board for repair or replacement without disturbing the mounting of the support on the panel.

Supports embodying the present invention may be used in pairs spaced apart a distance sufficient to accommodate a circuit board of selected dimensions bridging them, and several circuit boards may be mounted in series. The support has a vertically extending shaft, the edges of which have a slot running its length for slideably receiving therein the edge of a circuit board. The lower end of the slot terminates in a stop for holding the bottom edge of the circuit board corner, and the free end of the shaft has a flexible tab normally blocking the slot which may be manipulated to open it for inserting or removing the circuit board.

The end of the shaft remote from the tab and adjacent the stop has a quarter turn fastening member for securing the support onto an apertured panel. This fastener may have a flexible arched base and central post depending therefrom, the end of the post terminating in wings extending outwardly therefrom and spaced away from the base a distance slightly greater than the thickness of the panel.

When the post and wings are inserted into the panel aperture, shaped to receive them, with the base on one side of the panel and the wings on the other side of the panel, the support may be rotated 45° until shoulder means carried by the free ends of the arched base snap engage into the aperture, thus centering and locking the support rigidly on the panel.

Preferably, the circuit board support guide embodying the present invention is molded in one piece from plastic dielectric material.

OBJECTS OF THE INVENTION

It is therefore an object of the present invention to provide a circuit board support guide of the character referred to for removably securing a circuit board in a selected position on an apertured panel.

Another object is to provide a circuit board support guide which has means for releasing the circuit board therefrom without affecting the mounting of the guide on a panel.

Another object is to provide a circuit board support guide which may be resiliently carried in locked position upright on a panel.

Another object is to provide a circuit board support system which has cooperating means on its support and and an apertured panel which may be engaged upon turning the support 45° in the panel aperture.

Another object is to provide a circuit board support and guide which may be easily and inexpensively fabricated from moldable plastic dielectric material in one piece, and which may be easily installed and used without special tools or fixtures.

The foregoing and other objects and advantages of the invention will become apparent at this description proceeds, taken in conjunction with the accompanying drawings.

BRIEF DESCRIPTION OF THE DRAWINGS

In the drawings

FIG. 1 is a perspective view of an embodiment of the invention mounted on an apertured panel and securing a circuit board therein, showing the panel and board in section and with parts broken away.

FIG. 2 is a side elevational view of a support guide embodying the invention.

FIG. 3 is a side elevational view taken at a right angle to FIG. 2, showing parts broken away and in section.

FIG. 4 is a bottom plan view of a support, showing a part broken away.

FIG. 5 is a bottom plan view showing the support being locked onto an apertured panel, with parts of the support being shown in dotted lines to indicate locking engagement of the support onto the panel.

DESCRIPTION OF A PREFERRED EMBODIMENT

A support guide 11 embodying the present invention may be secured on a panel 12 for securing a circuit board 14 in a selected position. Preferably, the panel 12 has an aperture 15, the central portion 15a thereof being enlarged, for a purpose to be described hereafter.

The support guide 11 comprises an upstanding shaft 16, the lower end of which terminates in a neck 17 and radially extending diametrically opposed wings 18, projecting from a centrally disposed post 19 extending axially from the lower end of the neck 17. The upper surface 18a of each of the wings 18 is inclined upwardly toward the post 19. The wings 18 and post 19 are of a dimension adapted to pass through the panel aperture 15 and central portion 15a when aligned therewith.

An arched base, consisting of a pair of diametrically opposed legs 20, each having upstanding feet 20a and inclined walls 20b, and shoulders 21 projecting downwardly from the feet 20a, extend outwardly downwardly radially from the shaft 16 at the lower end thereof in a plane substantially perpendicular to the plane of the wings 18. The legs 20 and feet 20a are of a dimension relative to the aperture 15 to snap engage therein when the support guide 11 is rotated 45°, and are spaced apart from the wings 18 to accommodate the thickness of the panel 12, in a manner to be described.

The shaft 16 has an upstanding groove 25, preferably on each edge thereof, the groove being formed with an upper gate stop 26 and between side walls 27 along a central web 28 disposed between the side walls. The web 28 terminates short of the uppermost portion of the side walls 27, and the upper end of one of the walls carries a tab 29, which is reinforced by a rib 30 to permit flexing of the stop gate 26 with the tab, and the upper surface of the tab may have flutes 31. The other wall 27 has an inclined top edge 32 disposed opposite but terminating short of the tab 29.

The bottom wall 33 of the groove 25 may be flat and project outwardly from the shaft 16 to provide a lower stop wall for a circuit board 14 inserted in the groove 25, and slits 34 may separate the bottom wall from the legs 20 to permit flexure of the legs without disturbing a circuit board held in the groove.

OPERATION AND USE OF THE SUPPORT GUIDE

In use, the wings 18 and post 19 of the guide 11 are fit into and through the panel aperture 15 and its central portion 15a, and the legs 20 are pressed against the upper surface of the panel 12, causing them to flex and allowing the support guide to be rotated on the neck 17, the inclined walls 18a causing a cam-action against the legs 20 to center and hold the shaft 16 upright, and when the support guide 11 has been rotated 45° the shoulders 21 on the feet 20a of the legs 20 snap engage into the opposed ends of the aperture, thereby locking the support guide upright on the panel 12.

The circuit board 14 is then aligned with and pressed into the groove 25, the forward edge of the circuit board forcing the tab 29 and gate stop 26 away from the groove to allow entry of the circuit board edge into the groove, until the bottom edge of the circuit board meets the stop wall 33 and the upper edge of the circuit board clears the gate stop, allowing the tab and gate stop to flex back into normal groove blocking position, thereby securing the circuit board onto the support guide 11.

Removal of the circuit board 14 from the guide 11 is easily accomplished, without disturbing the securement of the guide on the panel, by flexing the tab 29 and gate stop 26 to open the groove 25, allowing withdrawal of the circuit board for replacement or repair. Withdrawal of the support guide 11 from the panel 12 may only be accomplished by prying the shoulders 21 from the aperture 15 and twisting the support guide a quarter turn.

A support guide embodying the present invention is particularly useful in mounting circuit boards in mobile equipment or devices subject to vibration, as the guide is suitable for removably securing a circuit board in a selected and rigid position but with cushioned mounting to resist shock. Additionally, the circuit board support guide permits simple changing of the circuit board without detaching the circuit board mounting means.

While a specific embodiment of the invention has been described in substantial detail, it is clear that many changes and additions in specific structural details may be made without departing from the spirit or scope of the invention, and it is not desired that the invention should be limited to the exact construction disclosed.

I claim:

1. In a one piece plastic guide for supporting a circuit board upstanding on a panel, said guide comprising: a shaft, base means on one end of said shaft for resiliently securing said shaft upstanding on said panel, grooved retaining means parallel to the longitudinal axis of said shaft extending on one edge thereof for removably holding the edge of said circuit board therein, a gate on said shaft normally closing said retaining means to prevent unintended removal of said circuit board therefrom, and tab means connected to said gate for opening said retaining means to permit insertion and removal of said circuit board into and from said retaining means without disturbing the mounting of said base means on said panel, said retaining means having a bottom wall separated from said base means by slits permitting flexing of said base means independently of said retaining means.

2. The guide recited in claim 1, wherein said bottom wall projects outwardly from said shaft.

3. The guide recited in claim 1, wherein said gate extends from the end of said retaining means.

4. The guide recited in claim 3, wherein said retaining means has a tapered end spaced apart from said gate to facilitate entry of said circuit board into said retaining means.

5. The guide recited in claim 1, wherein said tab means is disposed angularly to said shaft.

6. The guide recited in claim 5, wherein one surface of said tab is fluted.

7. The guide recited in claim 1, wherein said tab means is connected to said gate by a rib joining said retaining means.

8. In a one piece plastic guide for supporting a circuit board on a panel having an aperture which is wider in one dimension than in a second dimension, said guide having a shaft, retaining means on the shaft for removably holding said circuit board therein, and base means at one end of said shaft for securing said shaft on said panel, said base means comprising leg means projecting outwardly from said shaft adapted to span said aperture on one side of said panel, a post depending from said shaft adapted to project through said aperture to the underside of said panel, wing means extending outwardly from the free end of said post adapted to enter said aperture when indexed in alignment with said one dimension and to bind against the underside of said panel when indexed in alignment with said second dimension of said aperture, and shoulder means depending from said leg means adapted to enter said aperture when said wing means are indexed in alignment with said second dimension of said aperture.

9. In the guide recited in claim 8, wherein said guide shaft has a flexible closure for said circuit board retaining means adapted to open upon manipulation thereof for inserting or removing a circuit board from said guides independently of the securing of said shaft on said panel.

10. The guide recited in claim 8, wherein said leg means and said wing means project outwardly from opposed sides of said post and each of said means are disposed in a plane angularly to said post and to one another.

11. The guide recited in claim 8, wherein said wing means have a wall inclined in a direction away from said leg means.

* * * * *